US012139565B2

United States Patent
Al-haj Ali et al.

(10) Patent No.: US 12,139,565 B2
(45) Date of Patent: Nov. 12, 2024

(54) POLYMERIZATION PROCESS

(71) Applicant: Borealis AG, Vienna (AT)

(72) Inventors: Mohammad Al-haj Ali, Porvoo (FI);
Mubashar Sattar, Porvoo (FI);
Noureddine Ajellal, Porvoo (FI);
Henry Sleijster, Geleen (NL);
Charlotta Weber, Stockholm (SE)

(73) Assignee: BOREALIS AG, Vienna (AT)

( * ) Notice: Subject to any disclaimer, the term of this patent is extended or adjusted under 35 U.S.C. 154(b) by 503 days.

(21) Appl. No.: 17/624,449

(22) PCT Filed: May 18, 2020

(86) PCT No.: PCT/EP2020/063795
§ 371 (c)(1),
(2) Date: Jan. 3, 2022

(87) PCT Pub. No.: WO2021/004684
PCT Pub. Date: Jan. 14, 2021

(65) Prior Publication Data
US 2022/0348702 A1 Nov. 3, 2022

(30) Foreign Application Priority Data

Jul. 8, 2019 (EP) .................................... 19185004

(51) Int. Cl.
*C08F 10/02* (2006.01)
*B01D 1/06* (2006.01)
(Continued)

(52) U.S. Cl.
CPC ............ *C08F 210/00* (2013.01); *B01D 3/148* (2013.01); *B01D 5/006* (2013.01); *C08F 6/003* (2013.01);
(Continued)

(58) Field of Classification Search
None
See application file for complete search history.

(56) References Cited

U.S. PATENT DOCUMENTS

| | | | |
|---|---|---|---|
| 4,589,987 A | 5/1986 | Sherk | |
| 6,045,661 A | 4/2000 | Kreischer | |

(Continued)

FOREIGN PATENT DOCUMENTS

| | | |
|---|---|---|
| EP | 2295474 A1 | 3/2011 |
| GB | 826284 A | 12/1959 |
| WO | 2019/110316 A1 | 6/2019 |

*Primary Examiner* — Richard A. Huhn
(74) *Attorney, Agent, or Firm* — Lippes Mathias LLP

(57) ABSTRACT

The disclosure relates to a polymerization process.
The polymerization process comprises polymerizing an olefin monomer and a comonomer in the presence of a polymerization catalyst in a polymerization step conducted in a polymerization reactor in a solvent to produce a solution comprising a polymer of the olefin monomer and the comonomer.
The polymerization process comprises withdrawing an exhaust stream of the solution from the polymerization reactor in a withdrawing step.
The polymerization process comprises separating the exhaust stream to a first primary stream and a primary concentrated solution stream in a first primary separation step, wherein the first primary stream comprises hydrocarbons and polymer.
The polymerization process comprises separating the first primary stream to a second primary stream and a third primary stream in a second primary separation step, wherein the second primary stream comprises dissolved polymer and the third primary stream comprises majority of the hydrocarbons.
The polymerization process comprises cooling the third primary stream to a temperature of −80 to 20° C. in a primary cooling step to obtain a cooled third primary stream.

(Continued)

The polymerization process comprises separating the cooled third primary stream to a fourth primary stream and a fifth primary stream in a third primary separation step, wherein the fourth primary stream comprises hydrocarbons in vapour phase and the fifth primary stream comprises liquid hydrocarbons.

The polymerization process comprises returning the fourth primary stream and the fifth primary stream independently in a primary returning step to a location upstream of the polymerization reactor.

13 Claims, 2 Drawing Sheets

(51) Int. Cl.
    *B01D 3/14*     (2006.01)
    *B01D 5/00*     (2006.01)
    *C08F 6/00*     (2006.01)
    *C08F 210/00*     (2006.01)

(52) U.S. Cl.
    CPC .............. *B01D 1/06* (2013.01); *B01D 5/0012* (2013.01); *C08F 10/02* (2013.01)

(56) References Cited

U.S. PATENT DOCUMENTS

2012/0264911 A1    10/2012   Mills
2022/0032206 A1*   2/2022   Al-Haj Ali ............. B01D 3/143

* cited by examiner

POLYMERIZATION PROCESS

CROSS REFERENCE TO RELATED APPLICATIONS

This is a 371 of PCT Application No. PCT/EP2020/063795, filed May 18, 2020, which claims the benefit of European Application No. 19185004.9, filed Jul. 7, 2019, the contents of which are incorporated herein in their entirety.

FIELD OF THE DISCLOSURE

The present disclosure relates to a polymerization process, and particularly to a solution polymerization process.

BACKGROUND OF THE DISCLOSURE

Document WO 2009/013217 A discloses a process for the separation of a hydrocarbon-containing feed stream comprising the steps of: (a) optionally cooling said hydrocarbon-containing feed stream using an absorption refrigeration cycle, (b) introducing said feed stream into a first distillation zone for subjecting said feed to distillation conditions adapted to remove b1) a bottom stream comprising co-monomer, and b2) an overhead stream comprising hydrocarbon diluent, olefin monomer and further components such as H2, N2, O2, CO, CO2, and formaldehyde, and (c) introducing the overhead stream of step b) in a second distillation zone for subjecting said stream to distillation conditions adapted to remove c1) a bottom stream comprising substantially olefin-free hydrocarbon diluent, c2) a side stream comprising hydrocarbon diluent, and c3) an overhead vapour stream comprising olefin monomer, diluent and further components such as formaldehyde, H2, N2, O2, CO and CO2, and (d) cooling the temperature of said removed overhead vapour stream using an absorption refrigeration cycle prior to separating said olefin monomer from said diluent in said overhead vapour stream.

Document WO 2009/090254 A discloses a process for optimizing the recovery of unreacted monomers from a polymerization process, wherein said process comprises the steps of —recovering a fluid stream generated by the separation of the polyolefin product from the polymerization fluid comprising unreacted monomers and optionally comonomers; —contacting said fluid stream in an absorption zone with a scrub liquid comprising at least one C4-10 hydrocarbons, thereby absorbing at least a portion of the unreacted monomers in said scrub liquid; and —withdrawing from said absorption zone (i) a vapour overhead comprising light gas and (ii) an absorber bottoms scrub liquid comprising said C4-10 hydrocarbons and said unreacted monomer; thereby recovering said unreacted monomer in said absorber bottoms scrub liquid comprising said C4-10 hydrocarbons.

BRIEF DESCRIPTION OF THE DISCLOSURE

An object of the present disclosure is to provide a polymerization process, in which the loss of hydrocarbons in the vapour stream is minimized.

The object of the disclosure is achieved by a polymerization process, which is characterized by what is stated in the independent claim. The preferred embodiments of the disclosure are disclosed in the dependent claims.

The disclosure is based on the idea of providing a polymerization process comprising polymerizing an olefin monomer and a comonomer in the presence of a polymerization catalyst in a polymerization step conducted in a polymerization reactor in a solvent to produce a solution comprising a polymer of the olefin monomer and the comonomer;

withdrawing an exhaust stream of the solution from the polymerization reactor in a withdrawing step;

separating the exhaust stream to a first primary stream and a primary concentrated solution stream in a first primary separation step, wherein the first primary stream comprises hydrocarbons and polymer;

separating the first primary stream to a second primary stream and a third primary stream in a second primary separation step, wherein the second primary stream comprises dissolved polymer and the third primary stream comprises majority of the hydrocarbons;

cooling the third primary stream to a temperature of −80 to 20° C. in a primary cooling step to obtain a cooled third primary stream;

separating the cooled third primary stream to a fourth primary stream and a fifth primary stream in a third primary separation step, wherein the fourth primary stream comprises hydrocarbons in vapour phase and the fifth primary stream comprises liquid hydrocarbons; and returning the fourth primary stream and the fifth primary stream independently in a primary returning step to a location upstream of the polymerization reactor.

An advantage of process of the disclosure is that it reduces the concentration of the hydrocarbons, e.g. ethylene and hexane, that is lost in a bleeding stream since a considerable fraction of different hydrocarbons will be condensed. The bleeding stream comprises inert light hydrocarbons, which are vented from a feed tank to a downstream unit. Additionally, the possibility of cooling the first primary stream from the first primary separation step allows skipping a cooling section before a reactor. Thus, the disclosure increases the flexibility of the process and allows new optimization possibilities.

BRIEF DESCRIPTION OF THE DRAWINGS

In the following the disclosure will be described in detail by means of preferred embodiments with reference to the accompanying drawings, in which.

DETAILED DESCRIPTION OF THE DISCLOSURE

The disclosure relates to a polymerization process for polymerising one or more olefins in one or more polymerization reactors in solution, i.e. a solution polymerization process. The solution polymerization process is typically conducted in a solvent in which the monomer, eventual comonomers, eventual chain transfer agent and the polymer formed in course of the process are dissolved. Such processes are disclosed, among others, in documents WO 1997/036942 A, WO 2006/083515 A, WO 2008/082511 A, and WO 2009/080710 A.

Feeding

Figure 1:
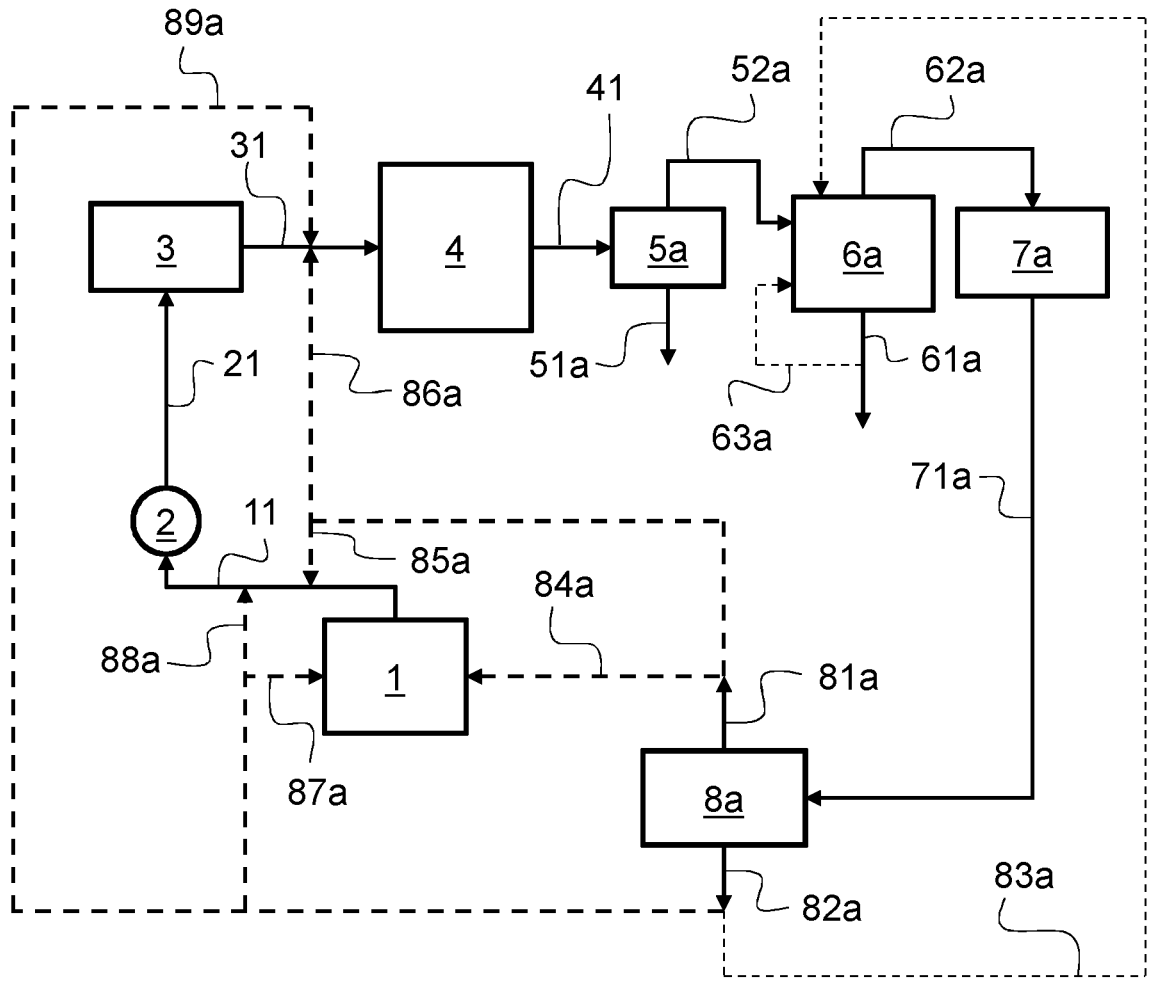
FIG. 1 is a schematic drawing of a polymerization process according to an embodiment of the disclosure.

According to an embodiment illustrated in FIG. 1, the polymerization process comprises a feeding step, in which a feed stream comprising monomer, comonomer, solvent and optional hydrogen is pressurized and cooled. The feed stream is fed from a feed tank 1 via line 11 to a feed pump 2, where it is pressurized. The pressurized feed stream is fed from the feed pump 2 via line 21 to a pre-cooling device 3, where it is cooled. For example, the pre-cooling device 3 is a heat exchanger. The cooled feed stream is withdrawn from the pre-cooling device 3 via line 31.

Polymerization

The polymerization process comprises a polymerization step, in which an olefin monomer and a comonomer are polymerized in the presence of a polymerization catalyst. The polymerization step is conducted in a polymerization reactor 4 in a solvent. The cooled monomer is received to the polymerization reactor 4 via line 31, for example in the form of the feed stream. The purpose of the polymerization step is to produce a solution comprising a polymer of the olefin monomer and the comonomer.

The polymerization step may also be conducted in more than one polymerization reactors. It is obvious that where the text refers to one polymerization reactor, it can be equally applied to more than one reactor and in specific to any one of the reactors. In addition, where a reference to more than one reactor has been made, it can be equally applied to one polymerization reactor.

Preferably, the olefin monomer used in the polymerization step has 2 to 10 carbon atoms. More preferably, the olefin monomer is selected from the group consisting of ethylene, propylene and 1-butene. Especially preferably, the olefin monomer is ethylene.

According to an embodiment, the comonomer used in the polymerization step is selected from the group consisting of alpha-olefins different from the olefin monomer; polyenes, such as non-conjugated alpha-omega-dienes, having from 3 to 10 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 10 carbon atoms, such as 1-butene, 1-hexene and 1-octene when the olefin monomer is ethylene; and ethylene, 1-butene and 1-hexene when the olefin monomer is propylene. 1-hexene and 1-octene are typically used as comonomers in solution polymerization. The polymerization step may also be conducted using more than one comonomers.

The polymerization catalyst may be any catalyst known in the art, which is capable of polymerizing the monomer and the comonomer. Thus, the polymerization catalyst may be a Ziegler-Natta catalyst as disclosed in EP 280352 A, EP 280353 A and EP 286148 A, it may be a metallocene catalyst as disclosed in WO 1993025590 A, U.S. Pat. No. 5,001,205 A, WO 1987003604 A and U.S. Pat. No. 5,001,244 A, or it may be a combination of these. In addition, other suitable catalysts, such as late transition metal catalysts, can be used.

The polymerization catalyst may be comprised in a polymerization catalyst system. According to an embodiment, the polymerization step is conducted in the presence of more than one catalyst.

According to an embodiment, the polymerization step is conducted in the presence of one or more chain transfer agent(s). The one or more chain transfer agent(s) may be used for controlling the molecular weight of the polymer, as it is known in the art. A suitable chain transfer agent is, for instance, hydrogen.

The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerization catalyst and the monomers. Further, it should be stable in the polymerization conditions. It further must be able to dissolve the monomer, the comonomer, the optional chain transfer agent and the polymer in the polymerization conditions.

As a result, during the polymerization step, the polymerization system is in its dense fluid state and comprises olefin monomers, comonomer, solvent, any chain transfer agent present and the polymer product.

The temperature in the polymerization reactor 4 is such that the polymer formed in the polymerization reaction is completely dissolved in the reaction mixture comprising the solvent, the comonomer, the eventual chain transfer agent and the polymer. The temperature is suitably greater than the melting temperature of the polymer. Thus, when the polymer is a homo- or copolymer of ethylene, the temperature is suitably from 120° C. to 220° C., such as from 150° C. to 200° C., depending on the content of comonomer units in the polymer. When the polymer is a homo- or copolymer of propylene, the temperature is suitably from 165° C. to 250° C., such as from 170° C. to 220° C., depending on the content of comonomer units in the polymer.

The pressure in the polymerization reactor 4 depends on the temperature, on one hand, and the type and the amount of the comonomer, on the other hand. The pressure is suitably from 50 to 300 bar, preferably from 50 to 250 bar and more preferably from 70 to 200 bar.

The residence time is short, typically less than 10 minutes.

The process is suitably operated continuously. Thereby streams of monomer, comonomer, catalyst and solvent, and, when present, stream chain transfer agent are continuously passed to the polymerization reactor 4.

The polymerization process comprises a withdrawing step, in which an exhaust stream of the solution, i.e. a product stream comprising unreacted monomer, unreacted comonomer, dissolved polymer and eventual unreacted chain transfer agent, is withdrawn from the polymerization reactor 4 either continuously or intermittently, preferably continuously. The exhaust stream is withdrawn from the polymerization reactor 4 via line 41.

First Primary Separation

The polymerization process comprises a first primary separation step, in which the exhaust stream is separated to a first primary stream, i.e. an overhead stream, and a concentrated solution stream, i.e. a bottom stream. The first primary stream comprises hydrocarbons and entrained polymer. Preferably, the first primary separation step is conducted using a separator, in which a liquid phase comprising the polymer and a vapour phase coexist.

According to an embodiment, the polymerization process comprises two polymerization reactors arranged parallel, and the exhaust streams of each polymerization reactor are combined before the first primary separation step.

According to an alternative embodiment, the polymerization process comprises two polymerization reactors arranged in series, wherein the exhaust stream of a first polymerization reactor is fed to a second polymerization reactor and the exhaust stream of the second polymerization reactor is separated in the first primary separation step.

According to yet an alternative embodiment, the polymerization process comprises two or more polymerization reactor arrangements, wherein each polymerization reactor arrangement comprises two or more polymerization reactors arranged in series. In this case, the exhaust streams of the polymerization reactor arrangements are combined before the first primary separation step.

The first primary separation step may be conducted in any process step where volatile compounds can be withdrawn from the solution. Typically, such a process step involves pressure reduction and preferably heating of the solution. One typical example of such a process step is flashing. For instance, the stream of the solution is heated and then passed along a pipe to a receiving vessel, i.e. a flash vessel, which is operated at a pressure, which is substantially lower than the pressure in the polymerisation reactor. Thereby a part of the fluid contained in the solution evaporates and is withdrawn as the first primary stream, i.e. the vapour stream. The first primary stream contains also polymer entrained in the vapour stream. The part remaining in the solution with the polymer forms the concentrated solution stream.

Preferably, the stream of the solution is heated so that a heated stream is produced. Typically, the temperature of the heated stream is from 200° C. to 300° C., preferably from 210° C. to 270° C. and more preferably from 210° C. to 250° C. Preferably, the temperature of heated stream is from 10° C. to 120° C., more preferably from 20° C. to 100° C. greater than the temperature of the solution in the polymerisation reactor.

The pressure of the stream of the solution is reduced so that the pressure in the receiving vessel is within the range of from 1 to 15 bar, preferably from 2 to 12 bar and more preferably from 5 to 10 bar. The pressure is preferably reduced so that it is at least from about 40 bar to about 295 bar lower than the pressure in the polymerisation reactor.

Flashing

According to an embodiment, the first primary separation step is a flashing step. Thereby a liquid phase and a vapour phase are present in the separation step. The flashing step is conducted in a first primary separation device 5a, which is preferably a flash vessel. The exhaust stream is received to the first primary separation device 5a via line 41a. The flash vessel is a vertical vessel preferably having a generally cylindrical shape. Thereby the flash vessel has a section, which has approximately a circular cross-section. Preferably, the flash vessel has a cylindrical section, which has a shape of a circular cylinder. In addition to the cylindrical section, the flash vessel may have additional sections, such as a bottom section, which may be conical, and a top section, which may be hemispherical. Alternatively, the flash vessel may also have a generally conical shape.

The temperature in the flash vessel is typically from 130 to 250° C. The temperature should be sufficiently high to keep the viscosity of the solution at a suitable level but less than the temperature where the polymer is degraded. The pressure in the flash vessel is typically from 15 bar to atmospheric, or even less than atmospheric.

The exhaust stream enters the flash vessel at the top. The solution travels downwards in the flash vessel while the gases, which evaporate from the solution, travel upwards. According to this preferred embodiment, the polymer solution forms a thin film, which falls downwards in the flash vessel. This facilitates the removal of hydrocarbons from the polymer solution. The gases are typically withdrawn from the top of the flash vessel while the solution is withdrawn from the bottom. Usually a small amount of polymer is entrained in the hydrocarbons and thus withdrawn from the flash vessel with the hydrocarbons.

According to an especially preferred embodiment, the exhaust stream is sprayed in the flash vessel. The spraying can be done by using one or more suitable nozzles, which disperse the solution stream into droplets. Such nozzles are well known in the industry and include air atomising nozzles, flat fan nozzles, hollow cone nozzles and full cone nozzles. Preferably, the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution.

As described above, the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle, it moves in the direction of the wall forming a downwards falling film. It is also possible that the flash vessel has a vertical, generally conical, shape. In such embodiment, it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements, the polymer solution forms a falling film within the flash vessel.

The polymer content in the primary concentrated solution stream withdrawn from the flashing stage is typically from 35 to 99% by weight. In other words, the primary concentrated solution stream withdrawn from the first flashing stage contains from 1 to 65% by weight of residual hydrocarbons.

When viewed from a different angle, the first primary stream withdrawn from the flash vessel is from 35 to 80% by weight from the total material streams withdrawn from the flash vessel. The first primary stream comprises unreacted monomer, unreacted comonomer, solvent and entrained polymer.

The primary concentrated solution stream is withdrawn from the first primary separation device 5a via line 51a. The first primary stream is withdrawn from the first primary separation device 5a via line 52a.

By using the flash as described above, it is possible to achieve high separation efficiency. For instance, separation efficiency for hydrocarbons containing six carbon atoms is at least 75% and preferably at least 80%. Additionally still, separation efficiency for hydrocarbons containing eight carbon atoms is at least 60% and preferably at least 65%. The separation efficiency is defined as the mass flow of the component withdrawn in the vapour stream divided by the (theoretical) mass flow rate of the component in the vapour stream in equilibrium conditions.

The primary concentrated solution stream contains polymer dissolved in solvent and unreacted comonomer. It may also contain residual monomer, which remains in the solution. Typically, the polymer concentration in the concentrated stream is from 40% to 90% by weight, preferably from 50 to 80% by weight and most preferably from 60 to 75% by weight, based on the total weight content of the concentrated solution stream. The primary concentrated solution stream is then typically in liquid phase. The primary concentrated solution stream may contain a minor amount of vapour, such as vapour bubbles. The amount of vapour in the concentrated stream is typically not more than 40% by volume, preferably not more than 30% by volume and especially preferably not more than 20% by volume, such as not more than 10% by volume or not more than 5% by volume.

The first primary stream contains unreacted monomer and other volatile compounds, such as hydrogen. The first primary stream also contains some of the solvent and comonomer. The first primary stream comprises also polymer entrained in the vapour phase. The vapour stream can optionally comprise a small amount of liquid droplets. The amount of such droplets is typically not more than 40% by volume, preferably not more than 30% by volume and especially preferably not more than 20% by volume.

In the parallel polymerisation reactor configuration, it is possible to combine the exhaust streams before they are passed to the separation step. In such a case they are suitably mixed upstream of a heating step. However, it is also possible to pass each of the streams of the solutions to a dedicated separation step, thereby producing two or more concentrated solution streams. If that is done, then it is preferred to combine the concentrated solution streams before they are passed to a subsequent separation step.

Second Primary Separation

The polymerization process comprises a second primary separation step, in which the first primary stream is separated to a second primary stream, i.e. a bottom stream, and a third primary stream, i.e. an overhead stream. The second primary stream comprises dissolved polymer and the third primary stream comprises majority of the hydrocarbons.

The second primary separation step is conducted using a second primary separation device 6a suitable for separating light components from heavy components. According to an embodiment, the second primary separation step is conducted using a packed column or a packed bed. In other words, the second primary separation device 6a is a packed column or a packed bed. The second primary separation device 6a comprises a vessel that is filled with suitable packing material.

For example, the packed column or packed bed comprises a cylindrical column equipped with a gas inlet and distributing space at the bottom; gas and liquid outlets at the top and bottom, respectively; and a supported mass of inert solid shapes, called packing. The support should have a large fraction of open area, so that flooding does not occur at the support plate. The first primary stream enters the distributing space below the packing and flows upwards through the interstices in the packing. During this flowing, the first primary stream is cools down and is divided into the second primary stream and the third primary stream. The second primary stream exits the cylindrical column through the liquid outlet at the bottom. The third primary stream exits the cylindrical column through the gas outlet at the top.

The first primary stream is received to the second primary separation device 6a via line 52a. The second primary stream is withdrawn from the second primary separation device 6a via line 61a. The third primary stream is withdrawn from the second primary separation device 6a via line 62a.

According to an embodiment, at least a part of the second primary stream is returned to the second primary separation step, i.e. to the second primary separation device 6. The part of the second primary stream is returned to the second primary separation device 6a via line 63a.

Cooling

The polymerization process comprises a primary cooling step, in which the third primary stream is cooled to a temperature of −80 to 20° C. to obtain a cooled third primary stream. According to an embodiment, the primary cooling step is performed in one stage. According to an embodiment, the primary cooling step is performed in multiple stages.

According to an embodiment, the third primary stream is cooled in the primary cooling step to a temperature of −80 to 10° C., preferably to −80 to 0° C., more preferably to −80 to −10° C., even more preferably to −80 to −20° C.

According to an embodiment, heat from the third primary stream is recovered in the primary cooling step and steam is generated using the heat.

According to an embodiment, the primary cooling step is conducted using a primary cooling device 7a, such as a deep cooler or a condenser. For example, the primary cooling device 7a comprises a heat exchanger.

The third primary stream is received to the primary cooling device 7a via line 62a. The cooled third primary stream is withdrawn from the primary cooling device 7a via line 71a.

Third Primary Separation

The polymerization process comprises a third primary separation step, in which the cooled third primary stream is separated to a fourth primary stream, i.e. an overhead stream, and a fifth primary stream, i.e. a bottom stream. The fourth primary stream comprises vapoured hydrocarbons and the fifth primary stream comprises liquid hydrocarbons.

The third primary separation step is conducted using a third primary separation device 8a suitable for separating light components from heavy components. Preferably, the third primary separation device 8a comprises a vessel, such as a hold-up tank.

According to an embodiment, the third primary separation step comprises
passing the third primary stream into the vessel;
maintaining a level of liquid in the vessel;
withdrawing the fourth primary stream from above said level of liquid in the vessel; and
withdrawing the fifth primary stream from below said level of liquid in the vessel.

The cooled third primary stream is received to the third primary separation device 8a via line 71a. The fourth primary stream is withdrawn from the third primary separation device 8a via line 81a. The fifth primary stream is withdrawn from the third primary separation device 8a via line 82a.

According to an embodiment, at least a part of the fifth primary stream is returned to the second primary separation step, i.e. to the second primary separation device 6a. The part of the fifth primary stream is returned to the second primary separation device 6a via line 83a.

Returning

The polymerization process comprises a primary returning step, in which the fourth primary stream and the fifth primary stream are independently returned to a location upstream of the polymerization reactor 4. In other words, the fourth primary stream and the fifth primary stream are returned to a location upstream of the polymerization reactor 4 independently from each other. In the location upstream of the polymerization reactor 4, the fourth primary stream and the fifth primary stream are combined with a fresh hydrocarbon stream and the combined stream is then fed to the polymerization reactor 4.

According to an embodiment, the fourth primary stream and the fifth primary stream are fed in the primary returning step independently to a feed tank 1, to a location between an outlet of the feed tank 1 and a feed pump 2, or to a location between a pre-cooling device 3 and the polymerization reactor 4.

Feeding of the fourth primary stream to the feed tank 1 is performed using line 84a. Feeding of the fourth primary stream to the location between the outlet of the feed tank 1 and a feed pump 2 is performed using line 85a. Feeding of the fourth primary stream to the location between the pre-cooling device 3 and the polymerization reactor 4 is performed using line 86a. Feeding of the fifth primary stream to the monomer feed tank 1 is performed using line 87a. Feeding of the fifth primary stream to the location between the outlet of the monomer feed tank 1 and a feed pump 2 is performed using line 88a. Feeding of the fifth primary stream to the location between the pre-cooling device 3 and the polymerization reactor 4 is performed using line 89a.

Secondary Separation

Figure 2:
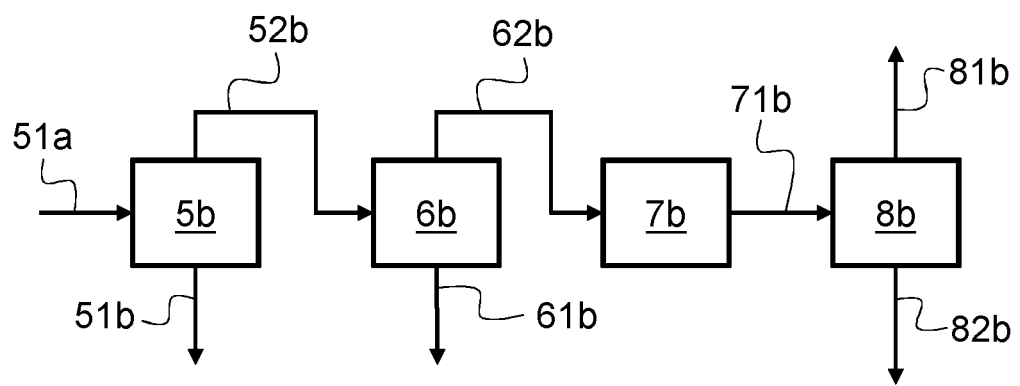
FIG. 2 is a schematic drawing of a first secondary separation step in the polymerization process of FIG. 1.

According to an embodiment illustrated in FIG. 2, polymerization process comprises a first secondary separation step, in which the primary concentrated solution stream is separated to a first secondary stream, i.e. an overhead stream, and a secondary concentrated solution stream, i.e. a bottom stream. Preferably, the first secondary separation step is conducted using a separator, in which a liquid phase comprising the polymer and a vapour phase coexist. According to an embodiment, the first secondary separation step is a flashing step.

The flashing step is conducted in a first secondary separation device 5b, which is preferably a flash vessel. The primary concentrated solution stream is received to the first secondary separation device 5b via line 51a. The first secondary stream comprises hydrocarbons and polymer. The first secondary separation step may be conducted in the same way as the first primary separation step.

The secondary concentrated solution stream is withdrawn from the first secondary separation device 5b via line 51b. For example, the secondary concentration solution stream is fed to a further separation step. The first secondary stream is withdrawn from the first secondary separation device 5b via line 52b.

According to an embodiment, the polymerization process comprises a second secondary separation step, in which the first secondary stream is separated to a second secondary stream, i.e. a bottom stream, and a third secondary stream, i.e. an overhead stream. The second secondary stream comprises dissolved polymer and the third secondary stream comprises majority of the hydrocarbons.

The second secondary separation step is conducted using a second secondary separation device 6b suitable for separating light components from heavy components. According to an embodiment, the second secondary separation step is conducted using a packed column or a packed bed. In other words, the second secondary separation device 6b is a packed column or a packed bed. The second secondary separation device 6b comprises a vessel that is filled with suitable packing material. The second secondary separation step may be conducted in the same way as the second primary separation step.

The first secondary stream is received to the second secondary separation device 6b via line 52b. The second secondary stream is withdrawn from the second secondary separation device 6b via line 61b. The third secondary stream is withdrawn from the second secondary separation device 6b via line 62b.

According to an embodiment, the polymerization process comprises a secondary cooling step, in which the third secondary stream is cooled to a temperature of −80 to 20° C. to obtain a cooled third secondary stream. According to an embodiment, the third secondary stream is cooled in the secondary cooling step to a temperature of −80 to 10° C., preferably to −80 to 0° C., more preferably to −80 to −10° C., even more preferably to −80 to −20° C.

According to an embodiment, the secondary cooling step is conducted using a secondary cooling device 7b, such as a deep cooler or a condenser. For example, the secondary cooling device 7b comprises a heat exchanger. The secondary cooling step may be conducted in the same way as the primary cooling step.

The third secondary stream is received to the secondary cooling device 7b via line 62b. The cooled third secondary stream is withdrawn from the secondary cooling device 7b via line 71b.

According to an embodiment, the polymerization process comprises a third secondary separation step, in which the cooled third secondary stream is separated to a fourth secondary stream, i.e. an overhead stream, and a fifth secondary stream, i.e. a bottom stream. The fourth secondary stream comprises vapoured hydrocarbons and the fifth secondary stream comprises liquid hydrocarbons.

The third secondary separation step is conducted using a third secondary separation device 8b suitable for separating light components from heavy components. Preferably, the third secondary separation device 8b comprises a vessel, such as a hold-up tank. The third secondary separation may be conducted in the same way as the third primary separation step.

The cooled third secondary stream is received to the third secondary separation device 8b via line 71b. The fourth secondary stream is withdrawn from the third secondary separation device 8b via line 81b. The fifth secondary stream is withdrawn from the third secondary separation device 8b via line 82b.

According to an embodiment, the polymerization process comprises a secondary returning step, in which the fourth secondary stream and the fifth secondary stream are returned independently to a location upstream of the polymerization reactor. In other words, the fourth secondary stream and the fifth secondary stream are returned to a location upstream of the polymerization reactor 4 independently from each other. The secondary returning step may be conducted in the same way as the primary returning step.

According to an embodiment, the fourth secondary stream is combined with the fourth primary stream and the fifth secondary stream is combined with the fifth primary stream before they are returned to a location upstream of the polymerization reactor. In other words, line 81b may be in a fluid communication with line 81a and line 82b may be in fluid communication with line 82a.

The invention claimed is:

1. A polymerization process, comprising
   polymerizing an olefin monomer and a comonomer in the presence of a polymerization catalyst in a polymerization step conducted in a polymerization reactor in a solvent to produce a solution comprising a polymer of the olefin monomer and the comonomer;
   withdrawing an exhaust stream of the solution from the polymerization reactor in a withdrawing step;
   separating the exhaust stream to a first primary stream and a primary concentrated solution stream in a first primary separation step, wherein the first primary stream comprises hydrocarbons and polymer;
   separating the first primary stream to a second primary stream and a third primary stream in a second primary separation step, wherein the second primary stream comprises dissolved polymer and the third primary stream comprises majority of the hydrocarbons;
   cooling the third primary stream to a temperature of −80 to 20° C. in a primary cooling step to obtain a cooled third primary stream;

separating the cooled third primary stream to a fourth primary stream and a fifth primary stream in a third primary separation step, wherein the fourth primary stream comprises hydrocarbons in vapour phase and the fifth primary stream comprises liquid hydrocarbons; and returning the fourth primary stream and the fifth primary stream independently in a primary returning step to a location upstream of the polymerization reactor.

2. The polymerization process according to claim 1, wherein the third primary stream is cooled in the cooling step to a temperature of −80 to 10° C.

3. The polymerization process according to claim 1, wherein the fourth primary stream and the fifth primary stream are fed in the returning step independently to a feed tank, to a location between an outlet of the feed tank and a feed pump, or to a location between a deep cooler and the polymerization reactor.

4. The polymerization process according to claim 1, wherein at least a part of the second primary stream is returned to the second primary separation step.

5. The polymerization process according to claim 1, wherein heat from the third primary stream is recovered in the cooling step and steam is generated using the heat.

6. The polymerization process according to claim 1, wherein the second primary separation step is conducted using a packed column.

7. The polymerization process according to claim 1, wherein the cooling step is conducted using a deep cooler or a condenser.

8. The polymerization process according to claim 1, wherein the comonomer used in the polymerization step is selected from the group consisting of alpha-olefins different from the olefin monomer; polyenes having from 3 to 10 carbon atoms, cyclic olefins having from 6 to 20 carbon atoms and cyclic polyenes having from 6 to 20 carbon atoms.

9. The polymerization process according to claim 1, comprising separating the primary concentrated solution stream to a first secondary stream and a secondary concentrated solution stream in a first secondary separation step, wherein the first secondary stream comprises hydrocarbons and polymer;

separating the first secondary stream to a second secondary stream and a third secondary stream in a second secondary separation step, wherein the second secondary stream comprises dissolved polymer and the third secondary stream comprises majority of the hydrocarbons;

cooling the third secondary stream to a temperature of −80 to 20° C. in a secondary cooling step to obtain a cooled third secondary stream;

separating the cooled third secondary stream to a fourth secondary stream and a fifth secondary stream in a third secondary separation step, wherein the fourth secondary stream comprises vapoured hydrocarbons and the fifth secondary stream comprises liquid hydrocarbons; and returning the fourth secondary stream and the fifth secondary stream independently in a secondary returning step to a location upstream of the polymerization reactor.

10. The polymerization process according to claim 9, comprising combining the fourth secondary stream with the fourth primary stream and combining the fifth secondary stream with the fifth primary stream before returning them to a location upstream of the polymerization reactor.

11. The polymerization process according to claim 1, wherein the third primary stream is cooled in the cooling step to a temperature of −80 to 0° C.

12. The polymerization process according to claim 1, wherein the third primary stream is cooled in the cooling step to a temperature of −80 to −10° C.

13. The polymerization process according to claim 1, wherein the third primary stream is cooled in the cooling step to a temperature of −80 to −20° C.

* * * * *